Patented Sept. 9, 1941

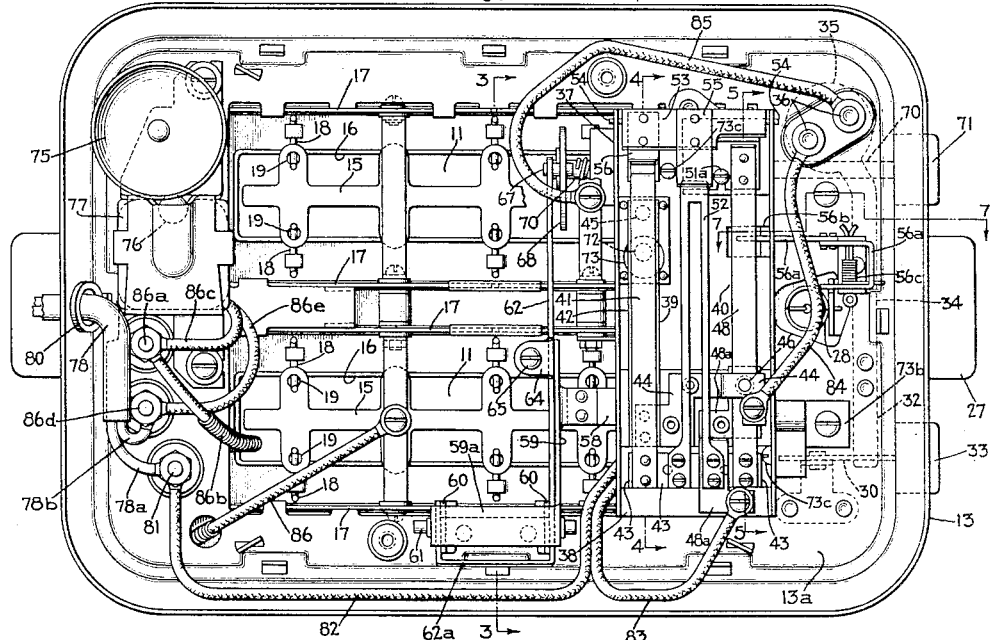

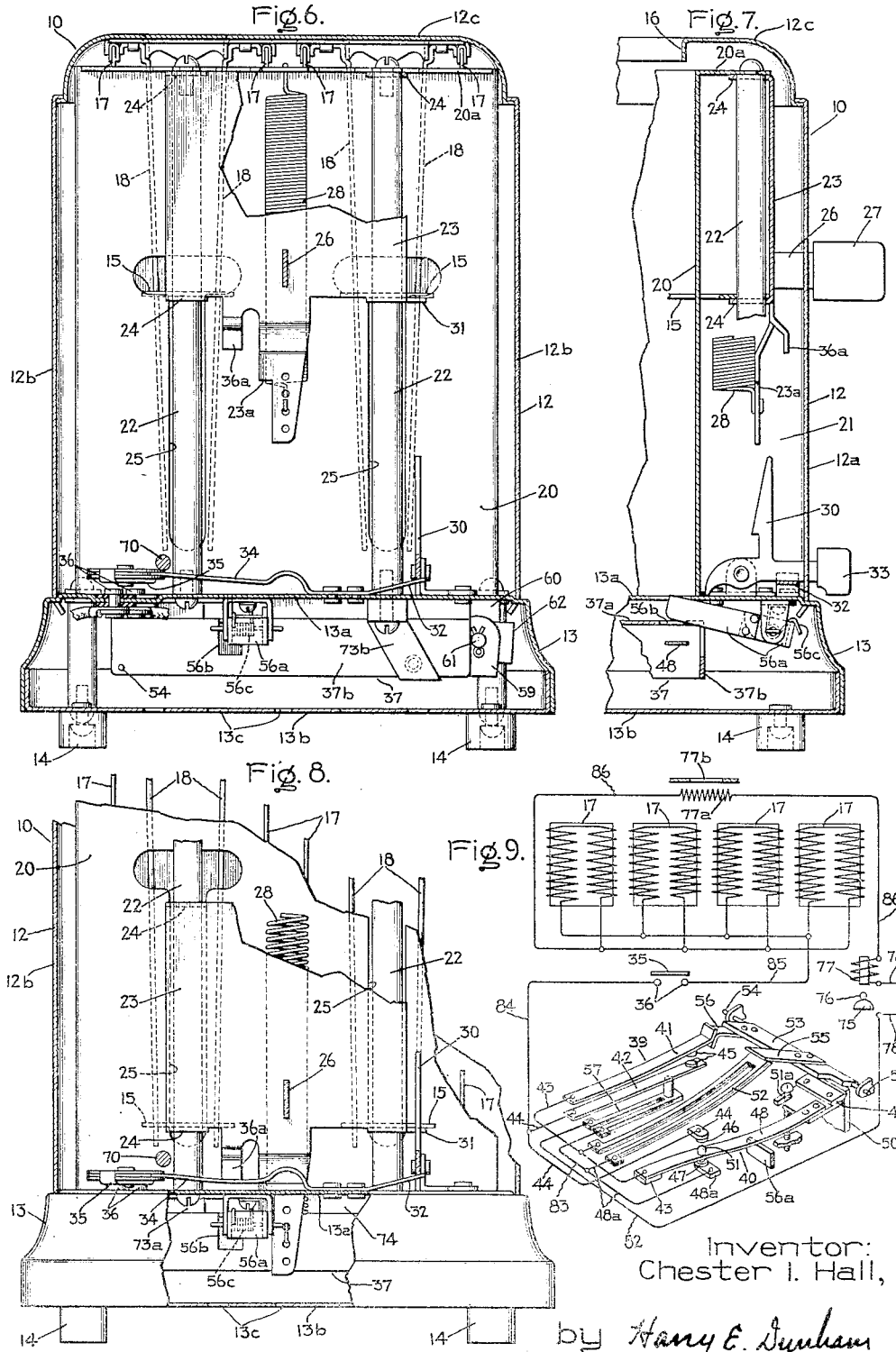

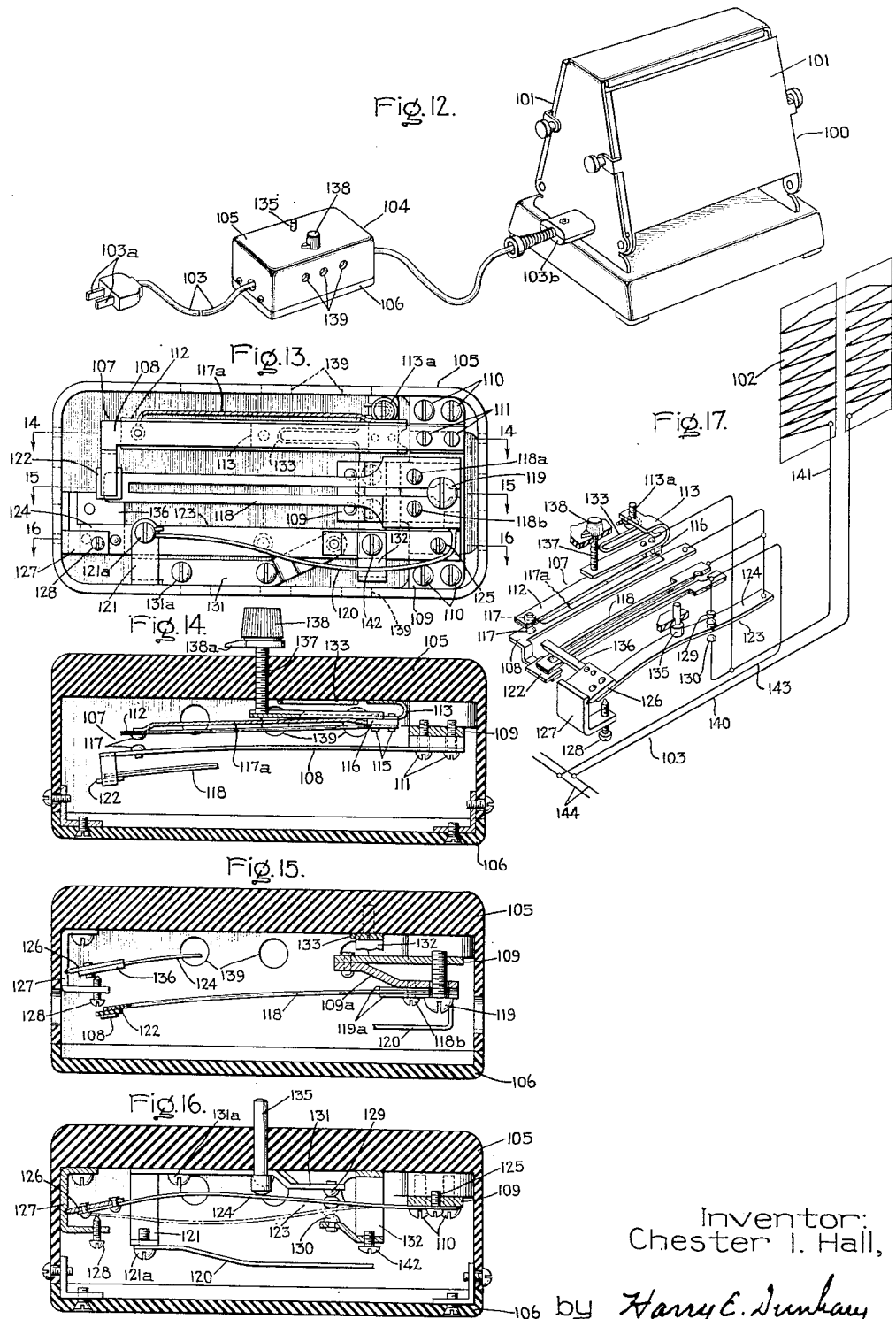

2,255,508

UNITED STATES PATENT OFFICE 2,255,508

ELECTRIC HEATER

Chester I. Hall, Schenectady, N. Y., assignor to General Electric Company, a corporation of New York Application July 1, 1937, Serial No. 151,446

13 Claims. (Cl. 219—19)

This invention relates to electric heaters, more particularly to electrically heated bread toasters and the like, and it has for its object the provision of improved means for timing the cooking operations in devices of this character.

It is an object of this invention to provide an improved timing means for automatically shutting off the heat at the end of the cooking interval, and further, the provision of improved means for automatically varying the cooking interval in accordance with the temperature of the cooking device so as to compensate for the stored heat of the device. It will be understood that in a bread toaster, for example, the temperature of the walls and other parts of the toaster increased with successive toasting operations, and, therefore, if the successive toasting intervals are of the same duration, it is quite likely that eventually the slices will be burned or over-toasted. This invention contemplates the provision of improved thermostatically controlled timing means for producing substantially uniform toast, irrespective of the temperature of the toaster either at the start or at any given instant during the toasting operation, and further, irrespective of the length of the time intervals between successive toasting operations.

In accordance with this invention, a main thermostatic timer is provided which operates to measure the cooking intervals. The timer operates on a heating and cooling cycle during each toasting interval. In other words, it is heated to a predetermined degree and then permitted to cool. The toasting operation is completed while the timer is cooling. A second or auxiliary compensating thermostatic member is provided which modifies the action of the first and shortens the toasting interval in accordance with the temperature rise in the toaster due to successive toasting operations so that each slice is toasted to the same degree. Should the toaster be permitted to cool before another slice is added, the compensating thermostatic member will lengthen the toasting interval proportionately.

For a more complete understanding of this invention, reference should be had to the accompanying drawings in which Fig. 1 is a bottom plan view of an electric toaster embodying this invention with parts removed so as to illustrate certain details of construction; Fig. 2 is a fragmentary view similar to Fig. 1 with parts broken away so as to illustrate certain details of construction; Figs. 3, 4 and 5 are sectional views taken through the lines 3—3, 4—4 and 5—5 respectively of Fig. 1 and looking in the direction of the respective arrows associated with these lines; Fig. 6 is a vertical sectional view taken through a part of the toasting apparatus of Fig. 1; Fig. 7 is a sectional view taken through the line 7—7 of Fig. 1 and looking in the direction of the arrows; Fig. 8 is a fragmentary view similar to Fig. 6, but illustrating certain parts in different operative positions; Fig. 9 is a diagrammatic representation of the heating elements of the toaster, together with certain control elements therefor arranged in accordance with this invention; Figs. 10 and 11 are fragmentary perspective views illustrating modified forms of a part of the mechanism used to control the heating elements of the toaster; Fig. 12 is a perspective view illustrating a toaster of modified form and controlled in accordance with this invention; Fig. 13 is a bottom plan view of a control device associated with the toaster of Fig. 12, parts being removed so as to illustrate certain details of construction; Figs. 14, 15 and 16 are sectional views taken through the lines 14—14, 15—15 and 16—16 respectively of Fig. 13 and looking in the directions of the respective arrows associated with these lines; and Fig. 17 is a diagrammatic representation of the heating means for the toaster of Fig. 12, together with certain control means therefor arranged in accordance with this invention.

Referring more particularly to Figs. 1–11, this invention has been shown in one form as applied to an electric toaster 10. The toaster 10 has two heating or toasting compartments 11. It is to be understood, however, that this invention is applicable equally as well to toasters having but a single toasting compartment, or to those having more than two toasting compartments. The heating or toasting compartments 11 are housed in an outer casing 12 which rests upon a base 13. The casing 12 has front and rear walls 12a, side walls 12b and a top wall 12c. The base 13 has an inturned flange 13a upon which the casing 12 rests, and the base in turn rests upon a plurality of feet 14. The base has a bottom wall 13b in which longitudinal ventilating slots 13c are formed. Arranged within each heating chamber or compartment 11 is a suitable bread slice support 15 which is vertically movable in the heating chamber from a toasting position shown in Fig. 8 to a non-toasting position shown in Fig. 6. The upper wall 12c of the casing is provided with openings 16 through which the bread slices are inserted into the toasting compartments for toasting, and through which they are projected by the supports 15 when the toasting operation has been completed. Positioned on opposite sides of the slice carriers 15 are electrical heating elements 17, the specific details of which form no part of this invention. Suspended on the upper wall 12c are wire guard members 18 which at their lower ends are directed through apertures 19 provided for them in the bread supports 15. A vertically positioned wall 20 is provided in the forward part of the toaster so as to define a relatively narrow compartment 21 at the front. This compartment is closed at the bottom by the base flange 13a, at the front by the wall 12a, at the sides by the side walls 12b and at the rear and top by the partition 20 which at the top has a forwardly projecting flange 20a. Mounted within the chamber 21 are a pair of upright posts 22 upon which the slice holders 15 are mounted and upon which they are arranged to slide vertically. As shown, a metallic plate-like support 23 for the holders 15 is mounted in the compartment 21 for vertical sliding movement on the posts 22, the plate having inturned lugs 24 at the top and bottom which are provided with apertures receiving the posts 22. Each of the bread carriers 15 is extended forwardly from its heating compartment into the heating chamber 21 where it is rigidly connected with the plate 23. As shown, the vertical wall 20 is provided with a pair of spaced vertically elongated apertures 25 which provide for movement of the parts of the bread carriers that extend through the wall 20 for connection with the plate 23.

The plate 23 is provided with a bar 26 rigidly secured to it and extending forwardly from it through the front wall 12a to the front of the toaster where an operating knob 27 is connected to the bar. The front wall is provided with a relatively elongated vertical slot (not shown) providing for vertical movement of the member 26. The carriage or plate 23 is biased to its upper position of Figs. 6 and 7 by means of a spring 28 secured at its lower end to the carriage, as shown, and at its upper end to the horizontal flange 20a provided on the wall 20. The carriage 23 when lowered is secured against the bias of this spring by means of a latch 30 which is arranged to engage an arm 31 rigidly secured to the carriage. The latch 30 is pivotally mounted on the flange 13a, and is biased to its latching position shown in Fig. 7 by means of a spring 32 also mounted on and secured to the flange. The latch, as shown, projects through the front wall 12a where an operating knob 33 is provided. The front wall has a vertical slot (not shown) through which the latch projects and which is sufficiently elongated to provide for pivotal movement of the latch. Once the carriage 23 has been locked in its lower position by the latch it will remain in this position until the latch is manually released by depressing the knob 33. This releases the carriage and permits it to move upwardly with the bread trays 15.

The spring 32 preferably will be and as shown is formed as part of a resilient switch arm or member 34 which carries a bridging contact 35 electrically insulated from it, and which is intended to engage a pair of spaced fixed contacts 36 mounted in and electrically insulated from the flange 13a. The fixed contacts 36 are connected in the energizing circuit of the heating element 17, as shown diagrammatically in Fig. 9. The contact arm 34 is engaged by an arm 36a on the plate 23 when the latter is lowered and latched so as to close the contacts 36.

The control arranged in accordance with this invention for controlling the energization of the heating elements 17 comprises a metallic supporting member 37 of channel-like form having a base 37a and side walls 37b. Mounted within the support 37 is a supporting block 38 formed of an electrically insulating material, such as a phenol condensation product, and secured to the base by screws 38a. Also supported within the casing are a pair of switches 39 and 40. The switch 39 has a pair of resilient contact blades or arms 41 and 42 arranged one above the other as shown in Fig. 4 and diagrammatically in Fig. 9, and biased toward each other by their inherent resiliency. Here it is to be noted that in the diagrammatic view of Fig. 9 the parts are shown in positions inverted to those they actually have when mounted in the toaster and as shown in Figs. 1, 2, 6 and 8. In other words, when the parts are mounted in the toaster, the switch arm 41 is the lowermost arm and the switch arm 42 is the uppermost. The position that the control device has in the toaster is immaterial, but for the sake of clarity the parts have been shown diagrammatically in Fig. 9 in the reverse order to the parts shown in Figs. 1, 2, 6 and 8.

The switch arm 41 is rigidly secured at one end, its lower end as viewed in Fig. 4, to a conducting plate 43 which is rigidly secured to the insulating support 38 and which extends across the support as shown in Fig. 1. The switch arm 42 at its corresponding end is rigidly secured to a conducting plate 44 also rigidly secured to the insulating support. The free ends of the switch arms 41 and 42 carry cooperating switch contacts 45.

The conducting plate 44, as shown more clearly in Figs. 1, 4 and 5, extends laterally across the housing 37 from the switch 39 to the switch 40 where it supports a fixed contact 46 which forms one of the elements of the switch 40. The switch 40 further comprises a second fixed contact 47 spaced from the contact 46 and between which a resilient buckled switch arm 48 is adapted to move. The plate 44 is depressed from its plane of Fig. 4 to the plane of the contact 46, shown in Fig. 5, so as to support the contact 46 in its proper spaced relation with reference to the contact 47. The contact 47 is mounted on a conducting plate 48a which is rigidly secured to the insulating block or support 38, and which is mounted on but insulated from the plate 43. The contact arm 48 at its lower end, as viewed in Fig. 5, is secured to the conducting plate 43, and at its opposite end it carries a knife-edge bearing 49 which is received in a seat provided for it in a supporting bracket 50 at the upper end of the casing 37. The knife-edge of the bearing resting on the seat is mounted on a plate-like member formed of an electrically insulating material, such as a suitable phenol condensation product. The buckled blade 48 carries a contact 51 which it moves with a snap action between its full and dotted line positions of Fig. 5 to selectively engage the contacts 46 and 47. A stop screw 51a mounted in the base 37a of the support limits or defines the dotted line position. As shown, it is received in a slot provided in the supporting plate of the knife-edge bearing member 49.

Also mounted within the housing 37 is a main thermostatic timing element 52. This thermostatic element is of the bimetallic type and preferably is formed in the shape of an elongated U, as shown in Figs. 1 and 9. One end of one leg of this element, the right-hand leg as viewed in Figs. 1 and 9, is electrically connected directly with the conducting plate 48a, and hence, it is electrically connected with the fixed contact 47 of the switch 40. The opposite leg of the thermostatic member 52 is electrically connected with the conducting plate 43 that extends transversely of the housing 37. It is to be noted that in the diagrammatic view of Fig. 9 the plates 43, 44 and 48a are illustrated by means of conducting wires between the various elements of the control device that they interconnect.

The thermostatic member 52 operates a suitable plate-like actuating member 53 for the switch 39. This member 53 is formed of any siutable electrically insulating material, such as a phenol condensation product. The actuating member 53 is provided with projecting pins 54 at its edges which pivotally support it in the side walls 37b of the housing 37, as shown in Figs. 3 to 5 and 9. The member 53 carries a pair of projecting members or tongues 55 and 56 arranged to engage the free end of the thermostatic member 52 and the switch arm 41 respectively. When the thermostat moves down, as viewed in Fig. 9, it permits the switch arm 41 to move down and close the switch 39, and when it moves upwardly it opens the switch. It will be understood that when the parts are reversed as in the base of the toaster, the member 53 can be moved upwardly to follow the thermostat 52, as it moves up, by the switch arm 41 which has sufficient resiliency to perform this function.

Also when the thermostat 52 moves down, as viewed in Fig. 9, it will engage the bearing 49 to actuate the spring arm 48 of switch 40 from its dotted line position of Fig. 5 to its full line position of this figure. The switch arm 48 is moved to the dotted line position initially when the knob 27 is depressed. For this purpose, a lever 56a is pivoted to the flange 13a in the path of movement of a shoulder 23a on the plate 23 that projects through a slot provided for it in flange 13a when the plate is depressed. When depressed the shoulder 23a engages the lever 56a to move it in a counterclockwise direction, as viewed in Fig. 7. The lever when thus moved enters a slot 56b in the casing 37 to engage the switch arm and move it from its full line to its dotted line position of Fig. 5. The lever 56a is biased to its position of Fig. 7 by means of a spring 56c. The portion of the lever 56a that engages the switch arm 48 is formed of an electrically insulating material, such as a phenol condensation product.

Positioned outside of the casing 37 between the base 37a and the heating chamber 11 is a second thermostatic member 57 also of the bimetallic type. The member 57 is secured at one end, its lower end as viewed in Figs. 2 and 4, to an insulating supporting member 58. The supporting member 58 is rigidly secured to a lever 59 which is pivotally mounted on supporting bearings 60 mounted in the base of the toaster and secured to the flange 13a. As shown in Fig. 1, there are two bearings 60 spaced apart and the member 59 is provided with a U-shaped lateral extension 59a having its two arms pivotally secured to the bearings 60 by means of a shaft 61. Also pivotally mounted on this shaft 61 is a second lever 62 that is considerably longer than the lever 59, as shown in Figs. 1 and 3. The lever 62 also is provided with the U-shaped end formation 62a having its two legs pivotally mounted on the shaft 61. The lever 59 is provided with an ear 63 formed substantially at right angles to the body of the lever and positioned opposite a similar ear 64 formed on the lever 62. A screw 65 passes freely through an aperture provided for it in the ear 64 and is received in threaded engagement in the ear 63. Surrounding this screw and interposed between the ears 63 and 64 is a compression spring 66. This connection between the levers provides means for adjusting the positions of the levers relative to all other and constitutes a factory adjustment. The free end of the lever 62 is provided with a pin 67 which is operated by a cam 68. The cam 68 is provided with a cam slot 69 which receives the pin 67. The cam 68 is mounted on and rigidly secured to a shaft 70. The shaft 70 extends forwardly through the front wall 12a of the housing 12 where an adjusting knob 71 is rigidly secured to it.

The free end of the thermostat 57 carries a button 72 formed of an insulating material, such as porcelain, and which projects through an opening 73 provided for it in the base 37a of housing 37. The button engages the switch arm 42 of the switch 37.

The housing 37 is mounted within the toaster so that its base 37a faces the heating chambers 11 of the toaster, and as previously pointed out, with the thermostatic member 57 interposed between the base and the heating chambers 11. The housing is directly secured to insulating blocks 73a and 73b by screws 73c. The blocks in turn are rigidly secured to the flange 13a. The thermostatic member 57 is shielded from direct heat radiation from the heating means 17 by means of a metallic plate 74 secured to the flange 13a on the base by means of screw fastening means 74a, and the thermostatic member 52 is shielded both by this plate and its own casing 37. The thermostatic member 57, like the thermostatic member 52, has an elongated U shape and it is adapted to be connected in to the energizing circuit of the toaster in a manner to be presently described.

Also arranged to be connected in the energizing circuit of the toaster is a signal device comprising a bell 75 having a spherical tappet 76. An electromagnet 77 is arranged when energized to retract the ball 76 and when deenergized to release it and permit it to move against the bell to give an audible signal. In addition, a visual signal is also provided. It comprises a light resistance glow coil 77a below a window 77b in the top wall of the toaster. The glow coil is arranged to be connected in the energizing circuit of the toaster.

A twin supply conductor cord 79 is provided to connect the toaster with a source of electrical supply. The cord 78, as shown, enters the base of the toaster through a bushing 80. The conductor 78a of the cord is secured to an anchor post 81 in the base, and this post is connected by means of a conductor 82 to one terminal or end 57a of the thermostatic member 57. The other terminal or end 57b of this thermostatic member is connected by a conductor 83 with the plate 48a which, as pointed out previously, is connected with the end of the right hand leg of the thermostatic member 52, and also with the fixed contact 47 of switch 40. A conductor 84 connects the plate 44 with one of the fixed contacts 36 of the toaster switch. The opposite contact 36 of this switch is connected by means of a conductor 85 with one terminal of the heating element 17. These elements are connected in parallel and the opposite terminal of these heating elements is connected by means of a conductor 86 to one side of the glow coil 77a, the opposite side of which is connected to the anchor 86a by means of a conductor 86b. This anchor is connected with one side of the electromagnet 77 by conductor 86c, the opposite side of which is connected anchor post 86d by means of conductor 86e. The opposite conductor 78b of the supply cord is connected to anchor 86d.

In the operation of the device with the parts thus connected, it will be understood that if when the toaster is plugged to an electrical supply source, the controlling member 27 is in its elevated position shown in Figs. 6 and 7 no current will flow through the heating elements 17. Under these conditions the switch contacts 36 are open and the parts of the control device are in their positions shown diagrammatically in Fig. 2 and also in Figs. 3, 4 and 5. Now assuming that the control knob 27 is depressed so as to move the bread trays 15 down into this heating compartments, the latching member 30 will engage the arm 31 to hold the member 23 in its depressed position and hence will hold the trays 15 in their toasting positions. Also when the knob 27 is depressed, the bridging contact 35 will close the contacts 36 and will hold them closed. Furthermore, when the knob 27 is depressed it actuates the column spring switch arm 48 from its position shown in Figs. 5 and 9 to close the contact 46.

Therefore, when the knob 27 is depressed it closes the switch contacts 36 and also closes the contact 46 of switch 40. This completes an energizing circuit for the heating elements 17 through the conductor 78a, the conductor 82, the thermostatic member 57, the thermostatic member 52, the switch arm 48, the contact 46, the conductor 84, the switch 35, 36, the conductor 85 and thence through the heating elements 17 to and through the energizing coil 77 of the signal device to the opposite conductor 79b. As the toaster heats up the thermostatic bar 52 due to the current flowing through it begins to heat and moves downwardly, as viewed in Fig. 9. As the thermostatic member 52 moves downwardly it permits the member 53 to move downwardly. Eventually as the thermostat 52 moves downwardly, as viewed in Fig. 9, the contact 45 carried by arm 41 will engage the contact 45 carried by arm 42. After this has happened and the thermostatic member 52 has been heated to a predetermined degree it will engage the bearing 49 and will snap the column spring 48 to open the contact 46 and to close the contact 47. The energizing circuit for the toaster through the switch 40 is interrupted by the opening of the contact 46, but it is maintained by the switch blades 41 and 42 from the conductor 78a, through the conductor 82, the thermostatic member 57, the contact 47 of switch 40, the switch arm 48 of this switch, the switch arm 41 of the switch 39, the switch arm 42 of this switch, the conductor 84 to the heating elements 17 and thence to and through the electromagnet 77 to the opposite side 79b of the supply source. It will be observed that when the thermostatic member 52 opens the contact 46 it cuts itself out of the energizing circuit and it thereupon begins to cool. As it cools, it moves upwardly, as viewed in Fig. 9, and as it so moves the tongue 55 and the plate 53 upwardly. Eventually as it moves up it will move the contact 45 on arm 41 away from its associated contact 45 so as to deenergize the heating elements 17 of the toaster. When this occurs the latch 33 may be operated to release the bread carriers 15 to permit them to move upwardly in their toasting compartments.

All the time that the heating elements 17 are energized and while the thermostatic member 52 is heating and cooling the thermostatic member 57 is being heated by the passage of current through it. The thermal storage characteristics of the thermostatic member 57 are so related to the thermal storage characteristics of the toaster itself that it heats and cools at substantially the same rate that the toaster itself heats and cools. As the thermostatic member 57 heats up it operates the switch arm 42 to vary the cut-off period of the main thermostat 52 to compensate for stored heat in the toaster. In other words, as the toaster heats up, the thermostatic member 57 moves downwardly, as viewed in Fig. 9, to permit the contact carried by arm 42 to move downwardly. Consequently, the thermostatic member 52 as it moves upwardly responsively to the removal of heat from it removes the contact 45 on switch 41 from its associated contact to deenergize the heating elements 17 before it would do so without the compensating thermostat 57. If successive slices of bread are toasted in rapid succession, the switch blade 42 is moved downwardly, as viewed in Fig. 9, continuously until a stabilized temperature condition is attained in the toaster whereupon it remains substantially stationary. If the toaster is permitted to cool between successive slices, the thermostatic member 57 after each operation will move the blade 42 upwardly to delay the cut-off period of the toasting interval. In this manner, the thermostatic member 57 compensates for stored heat in the toaster shortening the toasting interval as the toaster heats up so that each slice is toasted to substantially the same degree.

If the heating and cooling characteristics of the toaster are changed as by providing less ventilation or more ventilation, the thermal characteristics of the thermostatic member 57 will be changed accordingly.

It will be understood that the main thermostatic element 52 is self compensating to a certain extent. That is, due to some stored heat in the thermostat it will inherently shorten the toasting interval because not so much time will be required to heat it to the maximum temperature at which it cuts itself out of the energizing circuit of the toaster. The compensating action of the compensating thermostat 57 takes into consideration this self-compensation of the element 52.

It will also be understood that the resistance of the main thermostatic element 52 is such that it heats up relatively quickly during a toasting interval and rapidly moves to its position where it cuts itself out of the toaster circuit and completes the toaster circuit through the switch 39. It cools during the major portion of its operating cycle.

The advantage of this arrangement in using the cooling portion of the cycle to deenergize the toaster is of importance in that the thermostatic member conditions itself for an immediate successive toasting operation.

The basic time interval of a toasting operation is adjusted by setting the position of the compensating thermostatic element 57, which as previously pointed out is accomplished by the knob 71.

In Figs. 10 and 11, there are illustrated modified forms of this invention wherein the compensating thermostat has a somewhat different construction than shown in the first form. In Fig. 10, the compensating thermostatic member 57c is formed as a straight metallic member. In this case, heat is applied to the element 57c by a separate heating element 57d. The terminals of the heating element are connected in the control circuits in the same fashions as the two ends of the thermostat 57 of the first form.

In Fig. 11 a straight thermostatic element 57e is used, but in this case the element 57e is heated by the passage of current through it, the ends of the blade being connected in the circuit by conductor 57f.

It is not necessary that the control device be mounted within the base of the toaster. In Figs. 12–17 inclusive, I have illustrated my control device connected in the supply cord for the toaster. As shown in Fig. 12, there is illustrated a toaster 100 having bread trays 101 pivoted at their lower ends to swing outwardly from a vertical heating element 102 (shown diagrammatically in Fig. 17) positioned in the toaster casing between the slice trays or holders 101. The toaster is provided with an electrical supply cord 103 in which is inserted my control device 104. The control device 104 comprises a casing 105 closed at the bottom by a cover 106. Both the casing and cover are formed of an electrically insulating material, such as a phenol condensation product. The control element is essentially the same as described in connection with the first form, except that in this case both thermostatic elements are mounted within the same casing 105, and the compensating thermostat is not heated during the initial cycle of operation of the main timing thermostat.

As shown in Figs. 13–17, the control element comprises a switch 107. The switch 107 in turn comprises a switch arm 108 having one end, its right hand end, as viewed in Figs. 13 and 14, rigidly secured to a conducting plate 109 which extends transversely of the housing and which is rigidly secured to it by means of screws 110. Screws 111 function to secure the switch arm 108 to the plate 109.

The switch 107 further comprises a switch element 112 secured at one end to a bracket 113 that has a distorted U shape, as shown, and having its short leg secured to the inner surface of the top wall of the housing 105 in any suitable manner as by means of a screw 113a. The long arm of this member is rigidly secured to one end of the switch arm 112 by means of rivets 115. Preferably, and as shown an insulating block 116 will be interposed between the switch arm 112 and the support 113. The switch arms 108 and 112 carry on their free end contacts 117 arranged to engage each other, and the switch arm 108 is biased upwardly as viewed in Fig. 17 by its inherent resiliency. A "pigtail" connector 117a is secured at one end to bracket 113 and at the opposite end to the end of arm 112.

Also mounted within the housing 105 is a main thermostatic timing element 118 having a hair-pin shape. The upper leg of the thermostatic member, as viewed in Fig. 13, is secured directly to the conducting plate 109 through a branch arm 109a secured to the plate intermediate its ends in any suitable manner as by riveting. As shown this leg of the thermostatic member is secured to the portion 109a by means of a screw 118a and the whole thermostatic member is further secured to the main section of the plate 109 by a screw 119 which in insulated from the thermostatic member by sheets 119a formed of mica. The opposite leg of the thermostatic member 118 is electrically connected by a conducting lead 120 to a binding post 121 to which it is secured by a binding screw 121a, as shown. This leg is also secured mechanically to the portion 109a of the bracket by means of a screw 118b and is insulated from this leg by the mica sheets 119a.

The free end of the thermostatic member 118 engages an insulating member 122 extending laterally from the switch arm 108 to hold the switch 107 in its open position when the thermostatic member is at its normal room temperature.

The thermostatic member 118 is further arranged to control the operation of a switch 123 which comprises a flexible switch arm 124 buckled so as to be under compression. One end of the arm 124 is rigidly secured to the conducting plate 109 by means of a screw 125 and its opposite end carries a knife edge bearing 126 formed of an electrically insulating material and which is received in a bearing seat 127 provided for it and rigidly secured in the housing 105. A stop screw 128 is supported by the bearing member 127, and defines the dotted line position of the switch, as shown in Fig. 16. The switch arm 124 operates between a pair of fixed contacts 129 and 130. The contact 129 is mounted on a conducting member 131 which is electrically connected with the binding post 121, as clearly shown in Figs. 13 and 16 and diagrammatically in Fig. 17. The member 131 is rigidly secured to the housing by screws 131a. The other contact 130 is mounted upon a bracket 132 which extends from the position of the contact 130 to the inner surface of the top of the casing 105 and thence across this casing to a point slightly above the longitudinal center line of the casing, as viewed in Fig. 13. At this point it is electrically connected to and supports one end of a hair-pin shaped heating unit 133. The opposite leg of this heating unit is secured to the support 113 by means of the screw 113a. The conducting member 132 and the supporting member 113 mount the heating element 133 directly above the switch arm 112, which in this case is formed of bimetallic material so that it constitutes a second thermostatic member. In other words, in this case the arm 112 also functions as the compensating thermostat and the heater 133 is intended to apply heat to the compensating thermostat, as will be pointed out hereinafter in greater detail.

The switch 123 further comprises a push button 135 which extends through the top of the casing, as shown in Figs. 12 and 16. The button is arranged when depressed to engage the switch member 124 and move it from its position of Figs. 16 and 17 downwardly to its dotted line position of Fig. 16 to close the contact 130.

The thermostatic timing member 118 is arranged to engage an extension 136 formed of an electrically insulating material and secured to the knife-edge bearing 126 to move the switch from its dotted line position of Fig. 16 to its full line position of Figs. 16 and 17 during the operation of the timer.

Arranged to engage the long arm of the supporting member 113 is an adjusting screw 137 mounted in the top wall of the casing and provided on the exterior thereof with an adjusting knob 138. The screw adjusts the position of the long arm of the member 113, and hence, it adjusts the position of the bimetallic switch arm 112. This is to effect an adjustment of the basic time of the control device, and if desired a suitable scale may be provided on the top of the casing with which an index 138a on the knob cooperates.

The side walls of the casing 105 are provided with a series of ventilating openings 139.

The temperature control device is connected in the supply cord 103 between the cord terminal pins 103a and the plug 103b, as shown. One wire 140 of the supply cord passes directly through the housing 105 and is connected with one terminal of the heating element 102, as shown diagrammatically in Fig. 17. The other terminal of the heating element 102 is connected by means of the other conductor 141 of the supply conductor 103 to the conducting bracket 132 by means of a binding screw 142. This conductor 141 therefore is connected with the switch contact 130 and also with one side of the hairpin heating element 133, as shown diagrammatically in Fig. 17. Another conductor 143 of the supply cord is connected electrically with the binding screw 121a mounted on the conducting member 121. Consequently, this conductor is connected with one side of the main timing thermostatic member 118 and with the contact 129, as shown diagrammatically in Fig. 17. As shown in Fig. 17, a suitable source of electrical supply 144 is provided to which the pins 103a may be attached.

With the control device connected as described, it operates as follows:

When the toaster is plugged into its supply source no current will flow to the heating element 102 until the control button 135 is manually depressed. When this is depressed it moves the column spring 124 to its dotted line position in Fig. 16 to close the contact 130. When this happens an energizing circuit for the heating element 102 is completed from the left-hand conductor of the supply source 144 through the conductor 143, through the binding post 121a. From this point it passes through the conducting member 120 to one end of the thermostatic member 118, through the thermostatic member to its opposite end, thence through the plate 109 to the contact member 124, through this contact member to the closed contact 130 and thence through the heating element 102 to the opposite side of the supply source. This places the thermostatic member 118 in series with the heating element 102 and the thermostatic member therefore is heated and begins to move upwardly, as viewed in Fig. 17. As the thermostatic member moves upwardly, it permits the switch contacts 117 of the switch 107 to close and thereafter it engages the member 136 to move the column spring member 124 upwardly to its full line position of Figs. 16 and 17 to open the contact 130 and to close the contact 129. It will be observed that prior to the closing of the switch contact 129, the heating element 133 will be deenergized and will be out of the energizing circuit for the heating element 102 until the contact 129 is closed.

After the timer has operated in the manner just described, the energizing circuit for the heating element 133 will be completed from the left-hand supply conductor 144 through the conductor 143, binding post 121a, the conducting strip 131, the contact 129, and thence through the switch arm 124, the strip 109 to the switch arm 108 of switch 107, and thence through the closed contacts 117 and the "pigtail" 117a, the supporting member 113, the hairpin heating element 133, the conducting member 132 and the binding screw 142 to the conductor 141 through this conductor to the heating element 102, and thence to the opposite side of the supply source 144 through the conductor 140. It will be observed that when the contact 130 is opened the thermostat 118 will be shorted out of the energizing circuit. The thermostatic member 118 therefore will move downwardly and eventually upon cooling to a predetermined degree will engage the extension 122 to open the switch contacts 117 and thereby deenergize the toaster.

During the cooling cycle of the thermostatic member 118, the thermostatic member 112 will be receiving heat from the heating element 133 and will adjust the position of the contact 117 mounted on it. As it heats up, it tends to move upwardly. This advances the cut-off point of the main thermostatic timing member. As before, the thermostatic member 112 is correlated in its thermal characteristics to the thermal characteristics of the toaster 100 so that the thermostatic member compensates for the stored heat in the toaster. The casing 105 is ventilated by the openings 139 in the same manner that the main toaster is ventilated so that the thermostatic compensating member 112 will heat and cool at substantially the same rate as does the toaster.

The basic toasting interval is adjusted by the member 138 which adjusts the position of the thermostatic member 112.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A timer for electric toasters and the like having electric heating means comprising means controlling the energization of said heating means including a first switch having a pair of spaced fixed contacts and a contact movable between them, a second switch having a fixed contact and a movable contact, a thermostatic element, means for operating said first switch to close one of its said fixed contacts to energize said heating means and to simultaneously apply heat to said thermostatic element, the thermostatic element controlling both of said switches so that when it is heated it operates the movable contact of said first switch from said one fixed contact to its other fixed contact and the movable contact of said second switch to close its fixed contact so as to cut off the heat from the thermostatic element and to maintain the energization of said heating means, and said thermostatic element when cooling operating said movable contact of said second switch away from its fixed contact to deenergize said heating means.

2. A timer for electric toasters and the like having an electric heating element comprising a pair of switches for controlling the energization of said heating element, a thermostatic element, means for operating the first of said switches to a first position to energize said heating element and for simultaneously applying heat to said thermostatic element, the thermostatic element controlling said switches so that when it is heated it operates the first switch from said first position to shut off the heat from the thermostatic element and the second switch to a position to maintain the energization of the heating element, said thermostatic element cooling after the heat is shut off from it and while cooling operating said second switch to deenergize said heating element, a second thermostatic element controlling the operation of said second switch by said first thermostatic element so as to compensate for stored heat in said toaster, and means heating said second thermostatic element continuously while said heating element of said toaster is energized.

3. In a toaster and the like having an electric heating element, a timing device comprising a thermostatic element, means for heating said element and permitting it to cool while the heating element of said toaster is energized for a toasting operation, a switch operated by said thermostatic element to cut off the heat from said toaster as said thermostatic element cools, a second thermostatic element substantially thermally removed from the heat effects of said toaster heating element, means for heating said second thermostatic element while said toaster is heating and in accordance with its temperature so as to cause it to operate to compensate for stored heat in said toaster so that each slice is toasted to substantially the same color, and means for adjusting said second thermostatic element so as to vary the basic toasting interval of said toaster.

4. In a toaster and the like having electric heating means, a pair of separate switches connected in parallel controlling the energization of said heating means selectively, a thermostatic element controlling said switches, means for operating one of said switches to complete an energizing circuit for said heating means and for simultaneously applying heat to said thermostatic element, whereupon the element moves and when heated to a predetermined degree operates said one switch to break said energizing circuit and to remove the heat for said thermostatic element and to close said other switch to maintain an energizing circuit for said heating element, the thermostatic element when cooling opening said second switch to deenergize said heating element, and a second thermostatic element heated while said first thermostatic element is heated and cooled controlling said second switch to vary the opening thereof in accordance with the temperature of the second thermostatic element.

5. In a toaster and the like having electric heating means, a pair of separate switches controlling the energization of said heating means selectively, means closing the first switch to energize said heating means, a movable member when moved to a first position operating to close the second switch to maintain the energization of said heating element and when moved to a second position to open said second switch to deenergize said heating element, a thermostatic element for actuating said first switch to open and said movable member to said first position when the thermostatic element is heated to a predetermined degree, and for actuating said movable member to said second position when cooled a predetermined degree, means for heating said thermostatic element only while the first switch is closed, and a second thermostatic element heated while said heating element is energized controlling said second switch to advance the opening of said second switch.

6. A timing device for toasters and the like having an electric heating element comprising a support, an electrically conducting plate on said support, a pair of switches each having an element electrically connected with said plate, a thermostatic element having one end electrically connected with said plate, a first contact associated with the switch element of the first switch electrically connected with the other end of said thermostatic element and a second contact associated with said switch element of the first switch electrically connected with a second element of said second switch, means providing for an electrical connection between said second contact and a terminal of said toaster and said first contact with a terminal of an electrical supply source, and means for connecting the other terminal of said toaster with the other terminal of said supply source.

7. A timing device for toasters and the like electrically heated devices having a heating element comprising a support, a switch on said support having a movable element and a pair of fixed contacts with which said element engages selectively, a second switch on said support having a movable element and a relatively fixed element with which it cooperates, a thermostatic element on said support, an electrically conducting strip on said support electrically connecting said movable elements of said two switches with each other and with one end of said thermostatic element, the other end of said thermostatic element being connected with one of said fixed contacts of said first switch, the other fixed contact being connected with the relatively fixed element of said second switch, means providing for the connection of said latter fixed contact with a terminal of the heating element of said toaster and the other fixed contact with the terminal of an electrical supply source, and means for varying the position of said relatively, fixed element of said second switch in accordance with a thermal condition of said toaster.

8. A timing device for toasters and like electrically heated devices having a heating element comprising a support, an electrically conducting plate on said support, a switch on said support having a movable contact arm formed of flexible material and a pair of spaced fixed contacts between which said contact arm moves, one end of said arm having a bearing thereon which is received in a seat on said support and the other end being secured to said conducting plate, a second switch having a pair of flexible switch arms, the first of which is secured to said conducting plate, a thermostatic element having one end secured to said conducting plate, conducting strips connecting the first of said spaced fixed contacts of said first switch with the other end of said thermostatic element and the second with the second flexible arm of said second switch, a pivoted actuating member on said support controlled by said thermostatic element when heated to a predetermined degree by the passage of current through it to move to one position to permit said first arm of said second switch to move into engagement with the second arm thereof, and controlled by said thermostatic element while cooling to move to another position to separate the contact arms of the second switch, and the thermostatic element when heated to said predetermined degree moving said contact arm of the first switch into engagement with its first contact.

9. A timing device for toasters and like electrically heated devices having a heating element comprising a support, an electrically conducting plate on said support, a switch on said support having a movable contact arm formed of flexible material and a pair of spaced fixed contacts between which said contact arm moves, one end of said arm having a bearing thereon which is received in a seat on said support and the other end being secured to said conducting plate, a second switch having a pair of flexible switch arms, the first of which is secured to said conducting plate, a thermostatic element having one end secured to said conducting plate, conducting strips connecting the first of said spaced contacts of said first switch with the other end of said thermostatic element and the second with the second flexible arm of said second switch, a pivoted actuating member on said support controlled by said thermostatic element when heated to a predetermined degree by the passage of current through it to move to one position to permit said first arm of said second switch to move into engagement with the second arm thereof, and controlled by said thermostatic element when cooling to move to another position to separate the contact arms of the second switch, the thermostatic element when heated to said predetermined degree moving said contact arm of said first switch into engagement with its first contact, and means for varying the position of said second arm of said second switch in accordance with the temperature of said toaster.

10. In an electric toaster and the like having a heating element and a pair of terminals therefor, a timing device comprising a support, a switch on said support having a movable element and a pair of fixed contacts with which said element engages selectively, a second switch on said support having a movable element and a relatively fixed element with which it cooperates, a thermostatic element on said support, an electrically conducting strip on said support electrically connecting said movable elements of said two switches with each other and with one end of said thermostatic element, the other end of said thermostatic element being connected with the first of said fixed contacts, the second fixed contact being connected with the relatively fixed element of said second switch, a second thermostatic element having one end connected with the first contact of said first switch and its other end adapted to be connected with one terminal of an electric supply source, and the second contact of said first switch being adapted for connection with one terminal of the heating element of said toaster, the other terminal of which is adapted for connection with the other terminal of said supply source.

11. An electric toaster comprising a heating chamber, a base supporting said chamber, electric heating means for said chamber, a thermostatic element in said base controlling the energization of said heating means, means for heating said thermostatic element and permitting it to cool while the heating means of said toaster is energized for a toasting operation, a switch in said base operated by the thermostatic element to cut off the heat from said toaster when the thermostatic element has cooled a predetermined degree, a support within said base supporting said thermostatic element and switch so that the thermostatic element is shielded from direct radiant heat from the heating means of the toaster, a second thermostatic element interposed between the heating chamber and said support, a heat barrier interposed between said second thermostatic element and the heating means of said heating chamber, means for heating said second thermostatic element while the toaster is being heated, and said second thermostatic element having an operating connection through said support with said switch so as to vary the operation of said switch as the toaster is heated to vary the toasting interval.

12. A toaster comprising a heating chamber, a base supporting said heating chamber, an electrical heating element for heating said chamber, a switch in the base of said toaster arranged when moved to one controlling position to complete an energizing circuit to said heating element, a manually operable member accessible on the exterior of said toaster for moving said switch to said one position to complete the energizing circuit, a thermostatic element in the base of said toaster, means controlled by the operation of said switch to said one position for heating said thermostatic element as long as said switch is in said one position, the thermostatic element upon being heated to a predetermined degree moving to operate said switch from said one to another controlling position in which the energizing circuit for said heating element through the switch is deenergized and the heat is cut off from said thermostatic element, a second switch operated by said thermostatic element when heated to complete an energizing circuit for said heating element so that when said first switch is moved from said one position the energizing circuit is maintained through the second switch, and the thermostatic element upon cooling in response to the cut off of heat operating to open said second switch to deenergize said heating element, a casing in the base of said toaster housing said switches and said thermostatic element and shielding the thermostatic element from the heat of the heating element, a second thermostatic element controlling said second switch to advance the point at which said switch is opened by the first thermostatic element in accordance with the temperature of the second thermostatic element, a heat shield between said second thermostatic element and said heating element of said toaster, means separate from said heating element of said toaster, for heating said second element continuously during the interval of time that said heating element of said toaster is energized, and the second thermostatic element having thermal storage characteristics correlated to those of the toaster so as to compensate for the stored heat of the toaster.

13. In a toaster and the like having an electric heating element, a timing device comprising a thermostatic element, means for heating said thermostatic element and permitting it to cool while said heating element of said toaster is energized for a toasting operation, a switch operated by said thermostatic element to deenergize said heating element of said toaster while said thermostatic element is cooling, a second thermostatic element substantially thermally shielded from the heating effects of said toaster heating element, means for heating said second thermostatic element only while said first thermostatic element is cooling so as to control an element of said switch to vary the toasting period to compensate for stored heat in said toaster so that each slice is toasted to substantially the same color, and means for adjusting said second thermostatic element so as to vary the basic toasting interval of said toaster.

CHESTER I. HALL.